United States Patent [19]

Pitchon et al.

[11] 4,303,684

[45] Dec. 1, 1981

[54] RAPIDLY-SOLUBLE SWEETENER, PROCESS FOR ITS PREPARATION AND BEVERAGE MIX EMPLOYING IT

[75] Inventors: Esra Pitchon, Flushing, N.Y.; Marvin Schulman, Howell, N.J.

[73] Assignee: General Foods Corporation, White Plains, N.Y.

[21] Appl. No.: 130,941

[22] Filed: Mar. 17, 1980

[51] Int. Cl.³ .......................... A23L 1/09; A23L 2/40
[52] U.S. Cl. ........................... 426/312; 426/567; 426/569; 426/590; 426/591; 426/658; 426/385; 426/470; 426/474; 426/477
[58] Field of Search .............. 426/312, 384, 590, 591, 426/470, 471, 474, 477, 658, 564, 567, 569; 127/29, 30, 58, 61

[56] References Cited

U.S. PATENT DOCUMENTS

| | | | |
|---|---|---|---|
| 2,981,629 | 4/1961 | Ginnette et al. | 426/470 |
| 3,064,722 | 11/1962 | Morgan et al. | 426/470 X |
| 3,836,396 | 9/1974 | McNamara et al. | 127/30 |
| 3,965,273 | 6/1976 | Stahl | 426/591 X |
| 4,049,466 | 9/1977 | Walon | 127/29 |
| 4,051,268 | 9/1977 | Shires et al. | 426/590 X |
| 4,116,756 | 9/1978 | Quee | 159/45 |

FOREIGN PATENT DOCUMENTS 670457  9/1963  Canada ............................... 426/470

*Primary Examiner*—Esther M. Kepplinger
*Attorney, Agent, or Firm*—Mitchell E. Alter; Daniel J. Donovan; Thomas R. Savoie

[57] ABSTRACT

The present invention provides a rapidly-soluble sweetener, a process for preparing it, and improved dry beverage mixes employing it.

The composition preferably comprises from 15 to 65% fructose, from 15 to 30% of low dextrose equivalence dextrinized starch, and from 30 to 65% sucrose, on a dry solids basis. By preparing it with a density of 0.4 or less, solubility is greatly enhanced over prior art sweeteners, especially sucrose.

Because of the improved solubility, carbonation is not lost by requiring stirring of a sweetener when preparing a beverage from a dry carbonated beverage mix.

28 Claims, No Drawings

4,303,684

RAPIDLY-SOLUBLE SWEETENER, PROCESS FOR ITS PREPARATION AND BEVERAGE MIX EMPLOYING IT

DESCRIPTION

1. Technical Field

The present invention relates to the field of sweeteners, and more particularly to a rapidly-soluble sweetener, especially one suitable for dry beverage mixes.

Dry mixes for beverages, puddings, gelatin desserts, whipped toppings, frostings, icings, ice cream, and the like must be free-flowing to provide satisfactory dispensing, accurate measuring and uniform mixing. Many sweeteners form clumps, which not only adversely affect these functions, but make dissolving them more difficult. Other sweeteners, such as sucrose, which is the typical sweetener used in dry mixes, are ordinarily difficultly soluble at concentrations required. For example, when whipped topping mixes contain granular sucrose, a slight graininess sometimes remains even after vigorous mixing. And, in beverage mixes, vigorous mixing is usually required to obtain complete dissolution of granular sucrose. This can be a mild annoyance to a hot, thirsty individual trying to prepare a single serving of a beverage from a dry mix, especially in ice water. More critically, however, the need for vigorous stirring can seriously detract from the ability of a dry carbonated beverage mix to satisfactorily perform. The degree of stirring necessary to adequately dissolve sucrose in cold water can seriously dissipate beverage carbonation.

There is a need for, and the present invention provides, a carbohydrate-based sweetener which is dry and free-flowing, and rapidly and completely soluble in water or aqueous solution in amounts required for sweetness.

2. Background Art

The prior art has provided a number of processes for drying sugar solutions which comprise first forming a massecuite slurry composed of microcrystals of sucrose. Representative of variations on the massecuite approach is U.S. Pat. No. 3,582,399 which discloses that a granular free-flowing and rapidly soluble product is obtained by granule enlargement with a massecuite slurry. The massecuite can contain dextrose or a high D.E. starch hydrolysate in addition to the sucrose. In U.S. Pat. No. 3,619,293 there is a process for forming free-flowing, rapidly dissolvable crystalline sucrose products by spraying and drying a massecuite, and then aging the resulting aggregates. The product can contain various additives such as other sweeteners, such as sugars. In U.S. Pat. No. 3,619,294, dried massecuite aggregated microcrystalline sugar granules are employed as a means to combine crystalline sugar with additives. Where the sugar is a relatively non-sweet sugar such as dextrose, a sweeter sugar such as fructose can be impregnated into the granules. However, these products will sink rapidly in water and require considerable agitation to dissolve.

In U.S. Pat. No. 3,271,194, an alternative to the massecuite approach is disclosed. Therein a sugar solution and solid sugar are simultaneously atomized such that they undergo mixing. The product is dried to a density to above 50 grams per 100 cubic centimeters, but needs considerable agitation for dissolution.

In U.S. Pat. No. 3,836,396, a table sugar substitute which is less cariogenic than sucrose is disclosed. This product is a physical admixture of sucrose and fructose and/or maltose. Again, however, the product will sink rapidly in water and required considerable stirring to dissolve.

European Patent Application Publication No. 0,000,077, filed Dec. 12, 1978 and claiming priority in U.S. patent application Ser. No. 803,337, filed June 3, 1977, specifically addresses the use of sweeteners in dry mixes for carbonated beverages and discloses the use of essentially pure crystalline fructose. It is disclosed that the dry beverage mix, containing the fructose, carbonates more rapidly than when sucrose is employed; however, the fructose-containing beverage mix will sink when added to water and requires considerable mixing to dissolve.

Along this same line, U.S. Pat. No. 3,956,009 describes the preparation of product by spray drying a fructose solution. Here, fructose solutions are dried in the presence of separately introduced recycled products. Here again the products sink and cause solubility difficulties.

DISCLOSURE OF INVENTION

In accordance with the present invention, there are provided a dry, rapidly-soluble sweetener composition, a process for preparing the sweetener, and a dry beverage mix improved by it. The sweetener composition has a density of less than 0.40 grams per cubic centimeter and comprises a codried intimate mixture of from 5 to 85% fructose, from 5 to 60% dextrinized starch having a dextrose equivalence of less than about 15, and from 0 to 80% sucrose, all percentages being based on the dry weight of the composition. The process of the invention is useful for preparing products of this type and comprises: (a) preparing an aqueous solution comprising, on a dry solids basis, the materials indicated above; (b) dispersing a gas into the solution; and (c) drying the solution under conditions effective to produce a porous product having a density of less than 0.40 grams per cubic centimeter. The improved dry beverage mix comprises flavor, acidulent, coloring and a rapidly-soluble sweetener as defined in claim 1.

BEST MODE FOR CARRYING OUT THE INVENTION

The sweetener compositions of the present invention have a wide range of utilities, including all of the applications in dry food mixes for which sucrose is normally employed. The following description will, however, focus on the preparation of the sweetener for use in a dry mix for forming a beverage, particularly a carbonated beverage.

The product for use in a beverage mix should be free-flowing and dry, to facilitate accurate metering and dispensing in automatic packaging equipment. The formation of clumps during storage, either before or after packaging, can result in difficulties. The product should, therefore, also be relatively non-hygroscopic. It should, however, have a sweetness about the same as sucrose, because of the widespread familiarity with the relative sweetness of sucrose. Most importantly, the product should be rapidly soluble and require little or no agitation in the amounts required to obtain suitable sweetness.

It is an advantage of the products of the present invention that they float, at least momentarily, on the surface of water or aqueous liquid prior to submerging, and then dissolve completely, or nearly so, with no agitation. The preferred products of the invention will float momentarily on the surface of water in a drinking glass, and then completely dissolve almost immediately upon submerging. These preferred products, thus, do not require any agitation to assure their complete solution.

The sweetener composition will contain at least 5% and as much as 85% fructose, depending on the desired balance to be struck between its various beneficial properties. The more preferred products, especially for use in beverages, will contain from 10 to 65% fructose, and those presently considered most preferred will contain from 15 to 65%. The fructose is important for a number of functions, including its intense sweetness and its good solubility. Fructose from any source can be employed. The fructose can be employed in its pure form or in mixture with up to 30% non-fructose carbohydrates, such as those residual carbohydrates remaining from the conversion of starches from wheat, corn, potato, and cassava. High fructose starch syrup is meant to define those products of the enzymatic conversion of starches to a mixture of saccharides wherein fructose predominates and is preferably present in amounts of above 80% and, most preferably, about 90% or above, based on the weight of the solids. Particularly preferred are those syrups prepared from corn. Representative of these are the syrups available under the trademarks: Isomerose from Clinton Corn Processing Co., Corn Sweet from ADM Company and Isosweet from Staley Manufacturing Co. These syrups typically have moisture contents within the range of from 10 to 25%, which is useful in forming the solution with the dextrinized starch, and preferably also sucrose, in obtaining the codried intimate mixture.

The dextrinized starch employed according to the present invention will have a relatively low dextrose equivalence (DE) to maintain an overall low hygroscopicity for the composition and make it a better carrier for the highly hygroscopic fructose. Typically, the DE should be less than about 15 and will preferably be within the range of from about 0.5 to 10. The dextrinized starch will be employed, on a dry solids weight basis, at a level of from 5% to 60%, and preferably at a level of from 10% to 50%. Most preferably, the dextrinized starch will be present at a level within the range of from 15% to 30% based on the total weight of the composition.

There is no known criticality in the manner of preparing the dextrinized starch, and it is believed that material from any of the known procedures can be employed. Representative of the suitable commercially available dextrinized starches are those sold under the Morex trademark by Corn Products Corp, and under the Frodex trademark by American Maize Products Corp.

The presence of sucrose is not essential, according to the broadest aspects of the invention; however, it can be present at levels of up to 80%. It is, in fact, preferred to employ sucrose for its contribution to sweetness and because it is believed to accentuate sweetness. According to the preferred embodiments, then, sucrose is employed at a level of from 15% to 70% and is most preferably employed at a level within the range of from 30% to 50%, all percentages based on the dry weight of the total composition. It is an unexpected advantage of the present invention that the solubility of sucrose can be greatly enhanced, even when present in major amounts, and in the presence of a low DE dextrinized starch. The products of the invention employing sucrose are further advantageously unique because they can provide essentially the same sweetness per unit weight as sucrose, but do so in a product with greatly improved solubility.

It is presently belived important to have the components of the composition present as a codried intimate mixture having a density of less than 0.40 grams per cubic centimeter. The preferred products will have densities less than 0.30 grams per cubic centimeter, and most preferably less than 0.25 grams per cubic centimeter. There is no known lower limit on this density range from an effectiveness standpoint; however, products containing less than 0.05 grams of solids per cubic centimeter may cause problems in handling, and densities of less than 0.10 grams of solids per cubic centimeter will be very costly to produce and handle.

The preferred compositions of the present invention appear totally amorphous when viewed with the unaided eye. It is believed that the compositions do contain crystals, but that the crystals are so small that they are not distinguishable as such and do not adversely affect the solubility of the composition. The most preferred compositions will be present as what may be referred to as "solid solutions." This term is meant to define an intimate association of the components of the composition in the solid form in units too small to be distinguished by optical microscope. Thus, this term defines a completely homogeneous mixture of the components in the solid form as they would appear after codrying an aqueous solution under conditions effective to maintain crystal formation at an absolute minimum, preferably prevent any significant crystal formation.

The products of the invention can be ground and sized as desired. It is an advantage of the invention that the solubility of the product remains excellent without close control of the particle size, which traditionally has been a key factor in the rate of solubility. It is believed that the formulation of the invention, together with its light, porous nature, provides the rapid, complete solubility obtained by the products of the invention. Preferred products are, however, ground to obtain a desirable free-flowing property and will preferably be screened such that 95% pass through an 8 mesh U.S. Standard Sieve and are retained on a 100 mesh U.S. Standard Sieve (having approximately a 0.15 mm opening). The most preferred products will be sized to pass through a 20 mesh seive (having approximately a 0.84 mm opening) and be retained on a 100 mesh sieve (having approximately a 0.15 mm opening) with an average particle size of 400 microns.

The process, according to the invention, for preparing the rapidly-soluble sweetener composition comprises, in its broad aspects: preparing an aqueous solution with the solids as defined above, dispersing a gas into the solution, and then drying the solution under conditions effective to product a porous product having a density of less than 0.4 grams per cubic centimeter. There is no known criticality for the specific equipment employed to carry out this process and any of the known procedures of foam drying, spray drying, freeze drying, tray drying, and the like, which can be performed under conditions capable of incorporating the desired amount of void space in the product to obtain the desired densities, while drying the product to a moisture content effective to provide a free flowing product, can be employed.

It has been found, experimentally, that products produced by dryers of the type described in U.S. Pat. No. 4,116,756, provide highly satisfactory results with good reproducibility. The disclosure of this patent is thus incorporated herein in its entirety, it being understood that, with this type of equipment, as with all others, it is essential to disperse a gas into the solution prior to drying the solution.

The apparatus described in U.S. Pat. No. 4,116,756 comprises three basic processing stages within a single housing. In the first stage, the solution to be dried is conducted to a spray nozzle under superatmospheric pressure, sprayed through drying air, and collected on a belt. The belt is then passed to the second stage, wherein drying air from the first and third stages is passed through the product on the belt. In the third stage, cooling air is passed through the product on the belt. This process works especially well according to the present invention, where a gas is injected into the solution at a superatmospheric pressure of at least about 50 psig (approximately 3.5 $Kg/cm^2$), preferably about 100 psig (approximately 7 $Kg/cm^2$) greater than the superatmospheric pressure under which the solution is conducted to the spray nozzle. By dispersing the air in the solution in this manner, and discharging the spray from the nozzle in droplets, rapid drying into a very desirable product is obtained. This is in part due to the expansion of the droplets upon discharge. This increases the surface area of the solution to improve not only drying but also subsequent dissolution in water. Moreover, the voids created in this manner decrease the density of the product and enable it to float on the surface of water momentarily before it becomes moistened and dubmerges. Upon submersion, the products will almost instantly dissolve.

The solution as discharged can be at any solids concentration effective under the processing conditions to provide a product having the desired characteristics. Typically, solids contents should be at least 10% to provide efficient drying and less than 80% to provide a workable viscosity. Preferred solids contents will be within the range of from 45% to 70%.

From discharge at the spray nozzle, the droplets are contacted with drying air having a temperature within the range of from 180° to 220° F. (approximately 82° to 104° C.). The solution is contacted, typically, for from 1 to 5 seconds during its fall through the drying air and collects as a mat on a porous belt which continuously moves through the first drying chamber. At this point the material will have a moisture content within the range of from 75% to 95%, preferably from 80% to 90%. From the first chamber, the mat is passed to a second chamber where further air, preferably having a temperature within the range of from 130° to 170° F. (approximately 54° to 77° C.) and a relative humidity with the range of from 10% to 40%, is passed through the mat. The moisture content during this stage in processing will be reduced to near its final level of less than 3%, and preferably less than 2%.

In a third stage, cool dry air is passed through the product on the mat to reduce its temperature to a level effective for further processing such as grinding, sizing, mixing with other materials if desired, and packaging. The air desirably has a reduced relative humidity, preferably of from 10% to 30%, and a reduced temperature, preferably of from 60° to 90° F. (approximately 16° to 32° C.).

More conventional spray drying equipment can also be employed to effect drying. Typical of the dryers is a spray tower manufactured by Proctor and Schwartz Company of Philadelphia Pa. For operating a dryer of this type, the solution is preferably fed to a spray nozzle under a pressure of 120 psig (approximately 8 $Kg/cm^2$) and air or other gas is injected into the feed stram at 1400 psig (approximately 98 $Kg/cm^2$). In spray towers of this type having inner and outer cones, the inner cone is preferably cooled, such as with ambient air to prevent the product from adhering to the tower walls. The solution is contacted with drying air at an inlet temperature of 220° F. (approximately 104° C.) and an outlet temperature of 150° F. (approximately 66° C.).

Freeze drying under conventional conditions can also be employed. Typical of the drying equipment is Stokes Shelf Freeze Dryer. During freeze drying, the product is subjected to a vacuum, and the air which is dispersed in the solution due to its normal solubility in water and during preparation of the solution will cause expansion of the product during drying. Also, the solution of water vapor by the drying procedure will cause further expansion. Thus, injection of gas into the solution just before drying is not essential in freeze drying and, in fact, does not appear to markedly affect the end product. This loosely dispersed air, unlike in spray drying, is not necessary to expand the product and is rapidly lost from the product in the early stages of vacuum application, or even before this. When desired, however, air or other gas can be injected.

The sweetener composition of the invention is ideal for the preparation of dry beverage mixes of the type which comprise flavor, acidulent, color and sweetener; and the rapidly soluble sweetener of the present invention provides improved dry beverage mixes of this type because of its improved solubility which makes it possible to enjoy the beverage more rapidly with less potentially messy mixing.

The formulation of beverage mixes of this type are well known and are exemplified for example in U.S. Pat. No. 4,001,448 to T. Finucane which is incorporated herein by reference in its entirety. The colors, flavors, acidulents and other ingredients can be employed in a beverage mix improved by the sweetener of this invention.

The advantages of the rapidly-soluble sweetener become especially pronounced when used in dry beverage mixes containing or for use with a carbonating agent in addition to the color, flavor and acidulent. Because the sweetener is so rapidly soluble, the beverage does not have to be vigorously agitated to dissolve the sweetener. This can be a distinct advantage when compared to prior art compositions containing granular sucrose, where the stirring necessary to dissolve the sucrose would partially dissipate the carbon dioxide.

The carbonating agent can comprise a chemical agent, such as calcium carbonate, alone or with another carbonating agent, such as sodium or potassium carbonates or bicarbonates. Or any of the other prior art, chemical carbonating agents can be employed. The carbonation source disclosed by Stahl in U.S. Pat. No. 3,965,273 is particularly suitable, with the rapidly-soluble sweetener of the present invention forming the carbohydrate matrix holding the calcium carbonate particles. Thus, the calcium carbonate can be encapsulated according to the Stahl teachings, using the rapidly soluble sweetener as the matrix material. The Stahl patent diclosure is incorporated by reference to its entirety.

Alternatively, the carbonating agent can be a molecular sieve device having carbon dioxide adsorbed therein. Among the suitable devices are those comprising activated charcoal and zeolites. The disclosures of U.S. Pat. Nos. 3,930,053, 4,051,268 and 3,983,251, and said U.S. Ser. No. 803,337 are hereby incorporated by reference to their entireties for their disclosures of the preparation, composition and use of molecular sieve carbonating devices and the beverage mixes with an in which they are used. The decreased need for agitation afforded by the sweeteners of the present invention improves the performance of all dry carbonated beverage mixes by decreasing the loss of carbonation due to stirring.

The following examples are presented for the purpose of further illustrating and explaining the present invention and are not to be taken as limiting in any regard. Unless otherwise indicated, all parts and percentages are by weight.

EXAMPLE I

This example describes a preferred embodiment of the invention wherein an aqueous solution of 60 parts sucrose, 20 parts Isomerose 900 high fructose corn syrup, and 20 parts Morex 1918 10DE dextrin, and containing 70% total solids is dried on a DEC Damrow Company Model F500 Filtermat dryer of the type shown in said U.S. Pat. No. 4,116,756. The Isomerose 900 contains 90% fructose on a dry solids basis; thus, the amount of fructose in the solution is 18% on a dry solids weight basis.

The solution is fed to one SX-60/21 spray nozzle manufactured by Spraying System Corp., at a temperature of 120° F., a pressure of 1500 psig (approximately 105 Kg/cm$^2$), and at a rate of 300 pounds (approximately 136 Kg) per hour. Air is supplied to the first chamber at a temperature of 210° F. and at a rate of 2000 cubic feet (approximately 57 cubic meters) per minute. The air at the outlet from the chamber is cooled by the drying process to about 150° F. (approximately 66° C.). Prior to discharge from the nozzles, air under a pressure of 1700 psig (approximately 120 Kg/cm$^2$) is charged into the line carrying the solution to disperse it within the solution. The solution is discharged into the drying air in minute droplets which expand and lose moisture as they decend onto a porous belt and form a mat. The material on the mat has a moisture content of about 85%, never actually measured, as it is removed from the first stage. In a second stage, air at a temperature of about 165° F. (approximately 74° C.) and a relative humidity of about 20% is passed through the product on the belt at a rate of about 500 cubic feet (approximately 14 cubic meters) per minute. Upon exiting the second stage, the moisture content of the product in the mat is at about the final level. The third stage cooling chamber is not employed and the product is allowed to cool to ambient. The matted product, which appears amorphous, is ground by passing it through a 20 mesh U.S. Standard sieve. It is found to have a density of 0.260 grams per cubic centimeter, as measured by the following procedure: Product flows through a funnel into a measure cup. Density is equal to the net weight of a leveled cup over volume. Its moisture content is found to be 1.06%, as measured by the following procedure: vacuum oven for 24 hours at 26 inches Hg and 140° F. (approximately 660 mm Hg and 60° C.). The product is tested for solubility by dispersing in 60° F. (approximately 16° C.) water without stirring. It is found to be excellent, rating a 10 on a scale of 0 to 10, with 10 being the highest.

EXAMPLE II

This example describes the preparation of the sweetener of the invention by freeze drying instead of the process of Example I.

According to this example, a solution identical with that of Example I, except that the solids content is reduced to 10%, is prepared and freeze dried, using a Stokes Freeze Drier. The solution is first frozen to −110° F. (approximately −79° C.), then is placed under vacuum, and is then lyophilized at a plate temperature of 120° F. (approximately 49° C.) at an absolute pressure of 300 microns. The product is found to have a moisture content of 1.38% and a density of 0.267 grams per cubic centimeter, when measured as in Example I. The product appears slightly crystalline and dissolves rapidly, rating an 8 when tested as in Example I.

EXAMPLE III

The procedure of Example II is repeated, but this time employing a solids content of 70% in the starting solution.

The product appears slightly less crystalline than the product of Example II, and has a density of 0.373 grams per cubic centimeter, a moisture content of 1.78%, and a solubility rating of 4, all measured as in Example I.

EXAMPLE IV

This example repeats Example II, but employs a starting solution with a solids content of 30% and includes the step of injecting carbon dioxide into the solution which is then sprayed by a nozzle onto a tray prior to freezing. The product appears slightly less crystalline than that of Example II; and has a density of 0.317 grams per cubic centimeter, a moisture content of 1.98%, and a solubility rating of 4, all measured as in Example I.

EXAMPLE V

This example repeats the procedure of Example IV, but employs a starting solution with a solids content of 50%. Again, CO$_2$ was injected into the solution prior to freezing. The product appears slightly less crystalline than that of Example II, and has a density of 0.359 grams per cubic centimeter, a moisture content of 2.05%, and solubility rating of 5, all measured as in Example I.

EXAMPLE VI

This example repeats the procedure of Example III, but this time a Votator type scraped surface heat exchanger is used to cool the starting solution to a temperature of 0° F. (approximately −18° C.) as air is fed into the solution prior to freeze drying. The freeze dried product appears slightly less crystalline than that of Example II; and has a densiyt of 0.369 grams per cubic centimeter, a moisture content of 1.27%, and a solubility rating of 5, all measured as in Example I.

EXAMPLE VII

This example repeats the procedure of Example VI, but this time employs a solids content of 80% in the starting solution. The resulting product appears as crystalline as that of Example VI; and has a density of 0.256 grams per cubic centimeter, a moisture content of 1.97%, and a solubility rating of 5, all measured as in Example I.

EXAMPLE VIII

The procedure of Example II is repeated, but this time not employing a composition of the invention but using only sucrose in an aqueous solution with a solids content of 50%. Although the density of the product is highly crystaline and has a solubility rating of 0, all measured as in Example I.

EXAMPLE IX

This example illustrates an alternative method of spray drying a composition identical with that of Example V.

Here a double cone spray drier is fed the composition at a feed rate of 200 pounds (approximately 91 Kg) per hour under a pressure of 1100 psig (approximately 77 Kg/cm$^2$). Air was injected at 1200 psig (approximately 84 Kg/cm$^2$) into the solution prior to discharge from a Spraying System Corp. SX high pressure nozzle having a number 60 orifice and a number 21 spinner. The inlet air temperature is 203° F. (approximately 95° C.) and the outlet temperature is 153° F. (approximately 67° C.). Product collected from the tower with an air cooled inner cone had a density of 0.260, a moisture content of 3.3%, and a solubility rating of 10. All of these tests are conducted as in Example I.

EXAMPLE X

Formulation consisting of 53 parts sugar, 18 parts Isomerose 900, 18 parts Morex 1918, and 11 parts of carbonates (sodium bicarbonate, potassium carbonate, calcium carbonate) at a solid concentration of 70% was dried at conditions similar to Example I. Separately a formulation consisting of 42% sugar, 14% Isomerose 900, 33% Morex 1918, and 11% citric acid at solids concentration of 70% was also spray dried under conditions similar to Example I. The two dried products were combined at an approximate 50/50 ratio and provided an instantly soluble beverage with carbonation.

EXAMPLE XI

This example repeats the procedure of Example IX, but this time employs a feed solution containing 70% solids and varies certain of the drying conditions to produce a series of products.

The inner cone of the spray drier is cooled with air and the drier is operated under the following conditions to produce products having the following properties:

| Run | A | B | C | D |
|---|---|---|---|---|
| Inlet temp (°F.) | 200 | 200 | 203 | 200 |
| Outlet Temp (°F.) | 155 | 155 | 153 | 165 |
| Nozzle Pressure (psig) | 1500 | 900 | 1100 | 925 |
| CO$_2$ Injection Pressure (psig) | 1600 | 1000 | 1200 | 1000 |
| Product Moisture (%) | 1.3 | 1.3 | 3.3 | 3.2 |
| Product Density (gm/cc) | 0.242 | 0.242 | 0.260 | 0.255 |
| Solubility rating | 10 | 10 | 10 | 10 |

EXAMPLE XII

An instantly soluble dry beverage mix was obtained by gentle dry admixing 99.32 parts of the dry sweetener product of this invention, 0.3 parts of an instant commercial citrus flavor preparation, 0.3 parts of a commercially available fine powdered acidulant and 0.08 parts of a commercially available fine powdered buffer.

Nine hundred milliliters of ice cold water at 4° C. were placed in a pressure-proof container. On basis of 1 quart final beverage preparation, 96 grams of the above dry beverage mix are used. The instantly soluble dry beverage mix comprising the instantly soluble dry sweetener preparation which is the object of this invention were added into the water and the mixture stirred only very slightly with a long handled spoon. The entire mix was practically immediately completely dissolved.

Zeolite agglomerated disc shaped bodies similar to those described by Sherman et al, U.S. Pat. No. 4,123,390 Example I (A) charged with carbon dioxide were placed into the beverage and the container was promptly hermetically closed.

Desorbing of carbon dioxide from the adsorbent and gas bubbling through the beverage created violent turbulence in the beverage.

Following a five-minute preparation period, pressure was released and container opened.

A completely clear and transparent pleasantly tasting refreshing carbonated beverage was obtained having carbonation of 3.50 volumes, (i.e. 3.50 cc per ml of beverage solution measured at standard temperature and pressure. No haziness was evident and no undissolved residue could be found.

The above description is for the purpose of teaching the person skilled in the art how to practice the present invention. This description is not intended to detail all of the obvious modifications and variations of the invention which will become apparent upon reading. However, applicants do intend to include all such obvious modifications and variations within the scope of their invention which is defined by the following claims.

What is claimed is:

1. A dry, rapidly soluble sweetener composition sprayed under superatmospheric pressure and dried, having a density of less than 0.40 grams per cubic centimeter and comprising a codried intimate mixture of from 15 to 65% fructose, from 15 to 30% dextrinized starch having a dextrose equivalent of less than 15, and from 30 to 65% sucrose, all percentages being based on the dry weight of the total composition.

2. A composition according to claim 1 wherein the fructose is comprised of high fructose corn syrup solids.

3. A composition according to claim 1 wherein the components are present as a solid solution.

4. A composition according to claim 1 which is essentially amorphous.

5. A composition according to claim 1 wherein the moisture content is less than 3%.

6. A composition according to claim 5 wherein the moisture content is less than 2%.

7. A composition according to claim 1 wherein 95% passes through an 8 mesh U.S. Standard sieve and is retained on a 100 mesh U.S. Standard sieve.

8. A composition according to claim 1 wherein the dextrinized starch has a dextrose equivalence within the range of from 0.5 to 10.

9. A dry beverage mix comprising flavor, acidulent coloring and a rapidly-soluble sweetener as defined in claim 1.

10. A dry beverage mix as defined in claim 9 which further comprises a carbonating agent.

11. A dry beverage mix according to claim 10 wherein said carbonating agent comprises calcium carbonate.

12. A dry beverage mix according to claim 10 wherein said carbonating agent comprises a molecular sieve having carbon dioxide adsorbed thereon.

13. A dry beverage mix according to claim 12 wherein the molecular sieve comprises activated charcoal.

14. A dry beverage mix according to claim 12 wherein the molecular sieve comprises a zeolite.

15. A process for preparing a dry, rapidly-soluble sweetener composition which comprises: (a) preparing an aqueous solution comprising, on a dry solids basis, from 15 to 65% fructose, from 15 to 30% of a dextrinized starch having a dextrose equivalence of less than about 15, and from 15 to 70% sucrose; (b) dispersing a gas into the solution at superatmospheric pressure of at least about 50 psig; and (c) drying the solution under conditions effective to retain a sufficient amount of the gas therein to produce a porous product having a density of less than 0.40 grams per cubic centimeter.

16. A process according to claim 15 wherein the solution comprises from 15 to 65% fructose, from 15 to 30% dextrinized starch, and from 30 to 65% sucrose.

17. A process according to claim 15 wherein the solution is conducted to a spray nozzle under superatmospheric pressure and said gas is injected into the solution at a pressure of at least about 100 psig greater than the pressure of the solution.

18. A process according to claim 17 wherein the solution is discharged from said spray nozzle in droplets which expand upon discharge into a stream of drying air.

19. A process according to claim 18 wherein th droplets are partially dried by passage through drying air, are collected on a continuously moving porous belt to form a mat, and drying air is passed through the mat to dry the composition to a moisture content of less than 3% by weight.

20. A process according to claim 19 wherein the dried composition is ground.

21. A process according to claim 18 wherein the drying air has a temperature of within the range of from about 190° F. to 230° F. initially upon contact with the solution as it is discharged from the spray nozzles.

22. A process according to claim 15 wherein the dextrinized starch has a dextrose equivalence within the range of from 0.5 to 10.

23. A process according to claim 15 wherein the fructose is comprised of high fructose corn syrup solids.

24. A process according to claim 15 wherein the drying is conducted under conditions effective to retain a sufficient amount of said gas therein to produce a product having a density of less than 0.30 grams per cubic centimeter.

25. A process according to claim 15 wherein the solution is frozen and then dried by sublimation under vacuum.

26. A process according to claim 15 wherein the solution is formed into a stable foam prior to drying.

27. A process according to claim 15 wherein the solution has a solids content within the range of from 10 to 80% prior to drying.

28. A process according to claim 26 wherein the solution has a solids content within the range of from 45 to 70% prior to drying.

* * * * *

UNITED STATES PATENT AND TRADEMARK OFFICE
CERTIFICATE OF CORRECTION

PATENT NO. : 4,303,684
DATED : December 1, 1981
INVENTOR(S) : Esra Pitchon; Marvin Schulman It is certified that error appears in the above-identified patent and that said Letters Patent are hereby corrected as shown below:

Column 5, line 51, change "moisture" to --solids--
Column 7, line 47, change "moisture" to --solids--

Signed and Sealed this

Nineteenth Day of October 1982

[SEAL]

Attest:

Attesting Officer

GERALD J. MOSSINGHOFF

Commissioner of Patents and Trademarks